(12) United States Patent
Li

(10) Patent No.: US 10,173,817 B2
(45) Date of Patent: Jan. 8, 2019

(54) CONTAINER, DEVICE AND METHOD FOR MEASURING LIQUID VOLUME IN A CONTAINER

(71) Applicant: Shenzhen Mecare Network Technology Co., Ltd., Shenzhen (CN)

(72) Inventor: Xiaoliang Li, Shenzhen (CN)

(73) Assignee: SHENZHEN MECARE NETWORK TECHNOLOGY CO., LTD., Shenzhen (CN)

( * ) Notice: Subject to any disclaimer, the term of this patent is extended or adjusted under 35 U.S.C. 154(b) by 172 days.

(21) Appl. No.: 15/135,196

(22) Filed: Apr. 21, 2016

(65) Prior Publication Data
US 2016/0313167 A1 Oct. 27, 2016

(30) Foreign Application Priority Data
Apr. 24, 2015 (CN) .......................... 2015 1 0201537

(51) Int. Cl.
*B65D 51/24* (2006.01)
*B65D 1/02* (2006.01)
*G01F 22/02* (2006.01)

(52) U.S. Cl.
CPC .......... *B65D 51/24* (2013.01); *B65D 1/0207* (2013.01); *B65D 1/0223* (2013.01); *G01F 22/02* (2013.01)

(58) Field of Classification Search
None
See application file for complete search history.

(56) References Cited

U.S. PATENT DOCUMENTS

| | | | | |
|---|---|---|---|---|
| 4,700,561 A * | 10/1987 | Dougherty | ............... | G01N 7/00 73/19.05 |
| 7,013,727 B2 * | 3/2006 | Delnevo | ................. | G01F 23/14 73/290 B |
| 7,658,103 B2 * | 2/2010 | Nakamura | .............. | G01F 22/02 73/290 R |
| 8,220,502 B1 * | 7/2012 | Kelekar | ................. | G01F 22/02 141/5 |
| 8,959,997 B2 * | 2/2015 | Hanko | ...................... | G01F 3/38 73/290 R |
| 9,399,216 B2 * | 7/2016 | Samper | ............ | B01L 3/502746 |
| 2007/0190664 A1 * | 8/2007 | Kimura | ............... | B41J 2/17513 436/174 |

* cited by examiner

*Primary Examiner* — Peter Macchiarolo
*Assistant Examiner* — Jermaine Jenkins
(74) *Attorney, Agent, or Firm* — Pearne & Gordon LLP

(57) ABSTRACT

A device for measuring liquid volume in a container, wherein the measuring device includes a compression member, which is in sealed connection with a container to be detected, forms a sealed space in the container, and compresses gases in the sealed space under the effect of an external force, and the compressed volume value of the gases is a predetermined value; a pressure detector, which is disposed on the compression member, and configured to measure the pressure values of the gases in the container before and after compression; and a controller. A container and a method for measuring liquid volume in a container is further provided.

18 Claims, 10 Drawing Sheets

CONTAINER, DEVICE AND METHOD FOR MEASURING LIQUID VOLUME IN A CONTAINER

FIELD

The present invention relates to the field of smart devices, and more particularly, to a device for measuring liquid volume. The present invention also relates to a container capable of measuring internal liquid volume, and a method of measuring liquid volume in a container.

BACKGROUND

As the origin of life, water is indispensable substance to people, and a proper manner of drinking is helpful for keeping healthy. However, people used to drink water only according to their feelings, but can't intuitively know their water intake. With people's increased awareness of health and development of technology, a smart water drinking equipment becomes popular, which can precisely measure the required water intake for a man, so that people can rationally plan their water intake, and meanwhile, the water intake data will become an important part of a big health data. However, the present smart water drinking equipment is usually equipped with a measuring device on a container, which has some defects: I. there are certain restrictions on the structure (including shape, material and function, etc.) of the container due to the requirements on such aspects like water leakage protection, thermal insulation, or the like, therefore, an additional measuring device will further increase the designing and manufacturing difficulties of the container, and increase the product cost; II. the measuring device does not have universality, and each container needs to be designed uniquely, which further increases the production cost; and III. the existing measuring device is usually a liquid level transducer, which has poor stability, and is easy to cause measuring errors due to the inclination of the container and the shape of the container, and is difficult to satisfy the requirements of precise measurement.

Therefore, a measuring device with strong universality and good measuring stability is expected.

SUMMARY

In order to overcome the defects of the prior art, the present invention provides a device for measuring liquid volume in a container, which can precisely measure the liquid volume in the container, effectively eliminate the influences of liquid sloshing on the measuring results, and has good measuring stability. The measuring device can be matched with containers of different materials, functions and volumes, and has strong universality; moreover, the measuring device is convenient to use, and can complete the water intake detection during the process of use without a special operation.

The present invention provides a container capable of measuring internal liquid volume.

The present invention provides a method of measuring liquid volume in a container.

To solve the technical problems, the present invention employs a technical solution as follows:

A device for measuring liquid volume in a container includes:

A compression member, which is in sealed connection with a container to be detected, forms a sealed space in the container, and can compress gases in the sealed space under the effect of an external force, and the compressed volume value of the gases is a determined value;

A pressure detector, which is disposed on the compression member, and configured to measure the pressure values of the gases in the container before and after compression; and A controller, which is configured to receive the pressure values obtained by the pressure detector, and calculate the liquid volume in the container to be detected based on the pressure values as well as a determined compressed volume value stored in the controller and the volume value of the container to be detected.

As a further improvement manner of the foregoing solution, a limiting device is included, which is configured to limit the movement of the compression member after the compression member moves for a predetermined distance.

As a further improvement manner of the foregoing solution, at least two limiting devices are provided and are located on the same plane, the limiting devices are made of a conducting material, and the pressure detector starts to detect the pressure values in the sealed space when the at least two limiting devices are switched on.

As a further improvement manner of the foregoing solution, the limiting device includes at least one fixing member fixing member and an elastic member correspondingly disposed below the fixing member, both the fixing member and the elastic member are made of a conducting material, the elastic member can move elastically, so as to have a first state switched-on with the fixing member and a second state switched-off with the fixing member, and the pressure detector starts to detect the pressure values in the sealed space when at least one elastic member is under the first state.

As a further improvement manner of the foregoing solution, the compression member is a cover body, the cover body is provided with a protruding portion with a fixed and predetermined size, and the periphery of the protruding portion is provided with a sealing ring.

As a further improvement manner of the foregoing solution, the protruding portion is provided with a cabin body, and the pressure detector is disposed in the cabin body; the cabin body can be communicated with outside through an air hole disposed on the cabin body when the cover body is separated from the container, and is only communicated with the sealed space when the cover body is in sealed connection with the container.

As a further improvement manner of the foregoing solution, the pressure detector implements a waterproof function by covering a waterproof breathable film on the air hole and/or employing a waterproof pressure detector.

A device for measuring liquid volume in a container includes:

a compression member, which can be in sealed connection with a container to be detected, forms a sealed space in the container, and compresses gases in the sealed space under the effect of an external force;

A pressure detector, which is disposed on the compression member, and configured to measure the pressure values of the gases in the container before and after compression;

Volume detector, which is disposed on the compression member, and configured to detect a compressed volume value of the gases in the container; and A controller, which is configured to receive the pressure values obtained by the pressure detector and the volume values obtained by the volume detector, and calculate the liquid volume in the container to be detected based on the pressure values and the volume values above, and the volume value of the container to be detected.

As a further improvement manner of the foregoing solution, the volume detector includes an angle transducer and a screw thread disposed on the compression member, and the pitch of the screw thread is fixed and predetermined; the angle transducer is configured to detect the rotating angle value of the compression member, and can transmit the angle value to the controller.

As a further improvement manner of the foregoing solution, the compression member is a cover body, the cover body is provided with a protruding portion with a fixed and predetermined size, and the periphery of the protruding portion is provided with a sealing ring.

As a further improvement manner of the foregoing solution, the protruding portion is provided with a cabin body, and the pressure detector is disposed in the cabin body; the cabin body can be communicated with outside through an air hole disposed on the cabin body when the cover body is separated from the container, and is only communicated with the sealed space when the cover body is in sealed connection with the container.

As a further improvement manner of the foregoing solution, the pressure detector implements a waterproof function by covering a waterproof breathable film on the air hole and/or employing a waterproof pressure detector.

A container capable of measuring internal liquid volume includes a container opening, wherein the container includes the above device for measuring liquid volume in a container, the measuring device is in sealed connection with the container opening through the compression member, and forms a sealed space in the container.

As a further improvement manner of the foregoing solution, an inner wall of the container is provided with a bulge coiled in a circle.

As a further improvement manner of the foregoing solution, at least the container opening is made of a conducting material.

A method of measuring liquid volume in a container includes the following steps of:

S10: forming a sealed space in the container;
S20: compressing gases in the sealed space;
S30: obtaining liquid volume detection parameters, the parameters including a pressure value in the container before compression, a pressure value in the container after compression, and a compressed volume value of the gases in the container, and a volume value of the container; and
S40: using the liquid volume detection parameters to obtain the liquid volume in the container.

As a further improvement manner of the foregoing solution, wherein the step S20 of compressing the gases comprises arranging a compression member to reduce the volume of the sealed space through the movement of the compression member relative to the container, wherein the compression member is in sealed connection with the container during the movement.

As a further improvement manner of the foregoing solution, wherein the step S30 of obtaining the compressed volume value of the gases in the container comprises the compression member being vertical to the above movement direction, the area of a compression surface directly affected on the gases being fixed and predetermined, acquiring a movement distance value of the compression member, and obtain the compressed volume value of the gases in the container with reference to the area of the compression surface and the distance value.

As a further improvement manner of the foregoing solution, wherein the step of obtaining the movement distance value of the compression member comprises arranging a limiting device to fix and predetermine the movement distance of the compression member.

As a further improvement manner of the foregoing solution, wherein the step of obtaining the movement distance value of the compression member comprises connecting the compression member with the container through a screw thread, the pitch of the screw thread being fixed and predetermined, detecting a rotating angle value of the compression member, and calculating the distance value through the angle value and the pitch.

As a further improvement manner of the foregoing solution, wherein the step of detecting the angle value comprises arranging an angle transducer, getting and recording a value as a first angle value when the gases are compressed, getting and recording another value as a second angle value during a rotating process or when the rotating is stopped, the difference between the second angle value and the first angle value being the rotating angle value of the compression member for a corresponding time.

As a further improvement manner of the foregoing solution, wherein the step S30 of obtaining the pressure values in the container before and after compression comprises detecting the pressure values in the container before and after compression through a pressure transducer.

As a further improvement manner of the foregoing solution, wherein the step S40 of obtaining the liquid volume in the container comprises firstly obtaining a volume value of the gases in the container before compression according to a formula:

$$V1=P1Vx/(P1-P0)$$

Wherein, $V1$ is the volume value of the gases in the container before compression, $Vx$ is the compressed volume value of the gases in the container, $P0$ is the pressure value in the container before compression, and $P1$ is the pressure value in the container after compression;

Secondly obtaining the liquid volume in the container according to a formula:

$$V2=V-V1$$

Wherein, $V2$ is the liquid volume value in the container, and $V$ is the volume value of the container.

The present invention is advantageous in that:

This invention can precisely measure the liquid volume in the container, effectively eliminate the influences of liquid sloshing on the measuring results, and has good measuring stability; this invention has strong universality as it's adaptable with containers of different materials, functions and volumes; this invention is convenient to use, and it can complete a water intake detection during daily usage without a special and additional operation.

BRIEF DESCRIPTION OF THE DRAWINGS

The present invention will be described with reference to the drawings and embodiments hereinafter.

DETAILED DESCRIPTION

Figure 1:
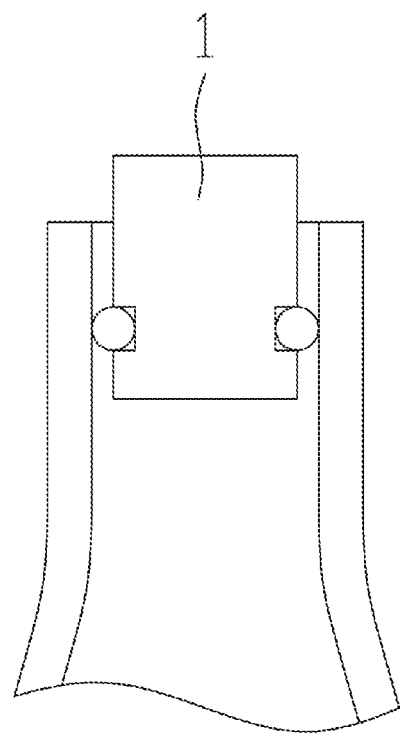
FIG. 1 is a block diagram of a first embodiment of a compression member according to the invention.

The concepts and specific structure of the present invention and technical effects produced thereof will be clearly and completely described hereinafter with reference to the embodiments and drawings, so as to sufficiently understand the objects, solutions and effects of the present invention. It should be understood that the embodiments in the present application and the features in the embodiments can be in combination without confliction.

It should be understood that when a certain feature is called as "fixed", and "connected" to another feature, the feature can either be directly fixed and connected to another feature, or can be indirectly fixed and connected to another feature, unless otherwise specified. Moreover, the descriptions like upper, lower, left and right used in the present invention are only direct to the mutual position relationship of each component of the present invention in the drawings.

In addition, the technical and scientific terms used herein are identical to the meanings usually understood by those skilled in the art unless otherwise defined. The terms used in the description herein are only used to describe specific embodiments, but are not intended to limit the present invention. The term "and/or" used herein includes any combination of one or more related listing items.

The present invention discloses a measuring device, which at least includes a compression member, a pressure detector and a controller, wherein the compression member forms a sealed space with a container placed for detection, and can compress gases in the space; the pressure detector is configured to obtain the pressure values of the gases; and the controller calculates the liquid volume in the container to be detected based on the pressure values, the compressed volume value of the gases, and the volume value of the container to be detected. To be specific, the compression member is in sealed connection with a container opening, and can compress the volume of the sealed space through the movement relative to the container, so as to raise the pressure in a cavity body, and the pressure detector is configured to detect the pressure values of the gases in the container before and after compression.

Figure 2:
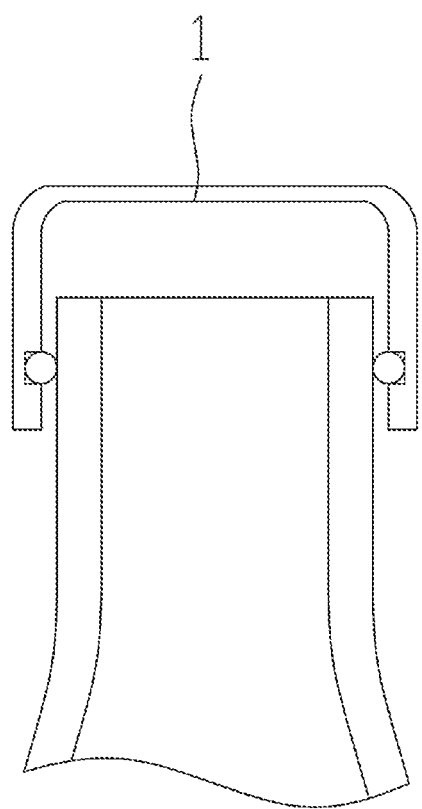
FIG. 2 is a block diagram of a second embodiment of the compression member according to the invention.
Figure 3:
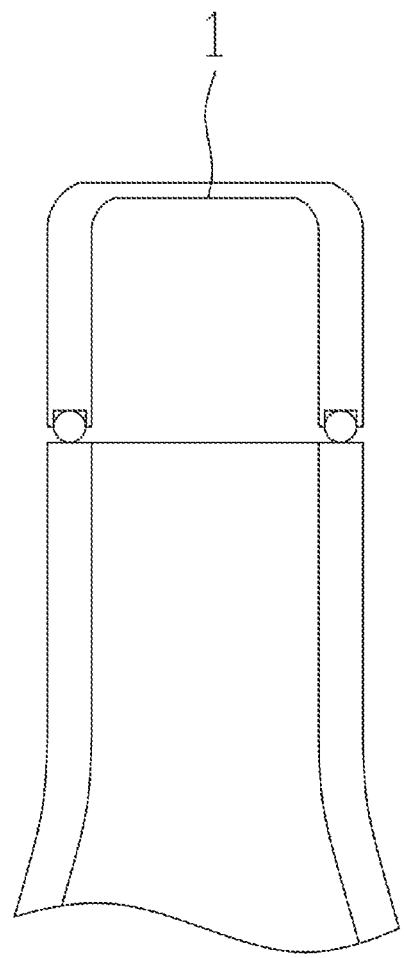
FIG. 3 is a block diagram of a third embodiment of the compression member according to the invention.

The compression member can be round, square, or the like, which is determined by the shape of the container opening. The compression member can seal through a built-in manner. As shown in FIG. 1, the compression member 1 is configured into a columnar shape, the outer wall of the compression member is provided with a sealing ring, the compression member is plugged in the container opening, and a sealing process is completed through the sealing ring and the inner wall of the container. The compression member can be of an externally containing type. As shown in FIG. 2, the compression member 1 is configured as a cover body, the inner wall of the cover body is provided with a sealing ring, the cover body and the container opening are buckled, and the sealing process is completed through the sealing ring and the outer wall of the container. Moreover, the compression member 1 may also employ a sealing manner of being parallel to the container. As shown in FIG. 3, the size of a sealing portion of the compression member 1 is equal to the size of the container opening, and sealing is implemented through the sealing ring therebetween. The compression member can be in sealed connection with the container directly to compress the gases, and may also complete the process through other accessory structures.

Figure 4:
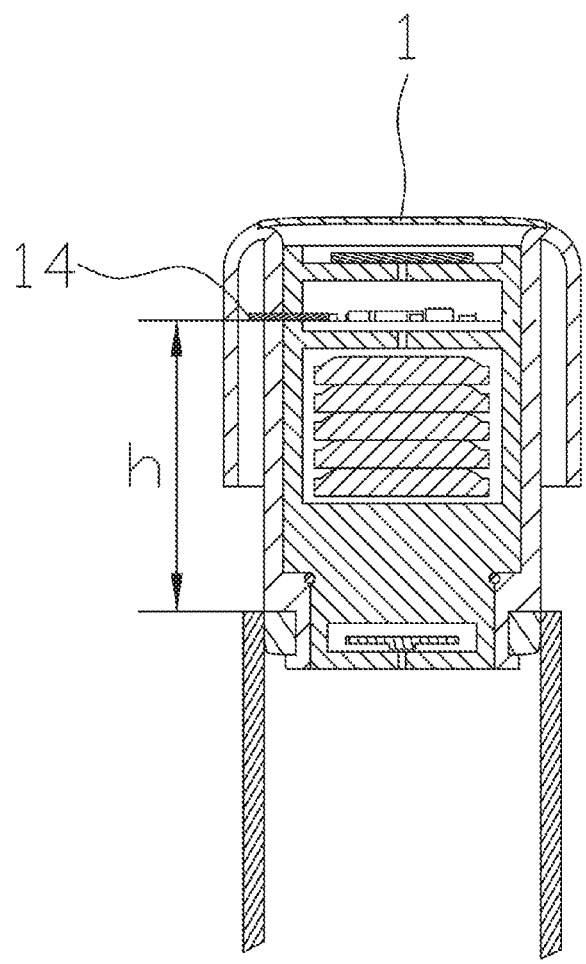
FIG. 4 is a sectional view of a first embodiment of a static detection solution according to the invention.

The present invention discloses a static detection solution of a measuring device. In this solution, the foregoing compressed volume value of the gases is obtained statically; that is, the compressed volume values is a predetermined value, which is saved in the controller, and the predetermined value can be known through defining/measuring in advance. To be specific, because the compressed volume of the gases is equal to the volume of the compression member invaded in the sealed space, the detection of the compressed volume is substantively the detection of the invaded volume of the compression member, while in the case that the compressed area of the compression member is fixed, the invaded volume can be known by only obtaining the movement distance of the compression member. The specific implementation is as follows:

A limiting device may be included, wherein the limiting device makes the compression member be held by the container after the compression member moves for a certain distance, so as to limit the movement of the compression member. By defining/measuring this distance value in advance, the movement distance of the compression member for each time can be precisely obtained; with reference to the area of the compression surface (the compression surface refers to a section vertical to the movement direction of the compression member and directly configured to compress the gases, wherein the area thereof can be known through defining/measuring in advance) of the compression member, the invaded volume which is namely the compressed volume value of the gases can be obtained through simple calculation. Preferably, referring to FIG. 4, and taking the position where the compression member and the sealing structure just form a sealing relationship as an origin, the limiting device 14 can make the compression member be held by the container opening after the compression member moves for a certain distance h relative to the container, wherein the value of h can be defined as a determined value by structural limitation.

In an ideal case, the pressure in the container needs to be synchronously measured after the compression member completes compression; however, the foregoing limiting device can only play a role of limiting the displacement and obtaining the movement distance, but it cannot implement the function of synchronous detection. In order to solve the problem, the present invention discloses an improvement manner of the limiting device.

Figure 5:
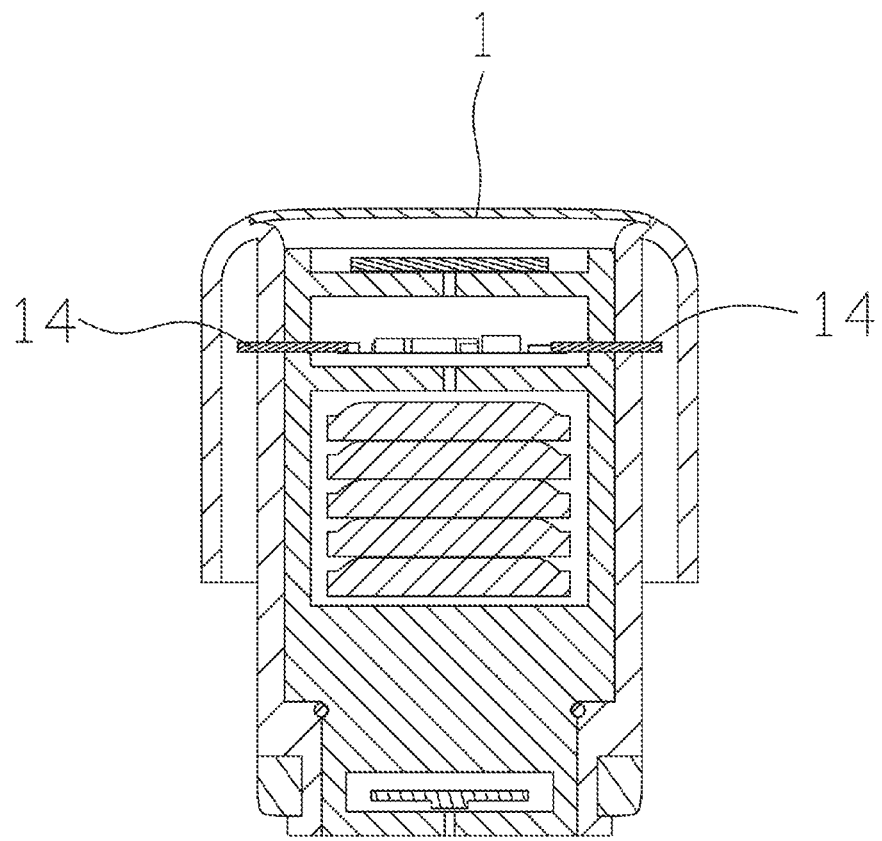
FIG. 5 is a sectional view of a second embodiment of the static detection solution according to the invention.

Now referring to FIG. 5, at least two limiting devices 14 are provided and are located on the same plane, the limiting devices 14 are made of a conducting material, and the pressure detector starts to detect the pressure values in the sealed space when the at least two limiting devices 14 are switched on. This manner is suitable for the container having a conducting function. When the container opening is contacted with the two limiting devices at the same time, the limiting devices are switched on through the container, so that the pressure detector is triggered to work.

Figure 6:
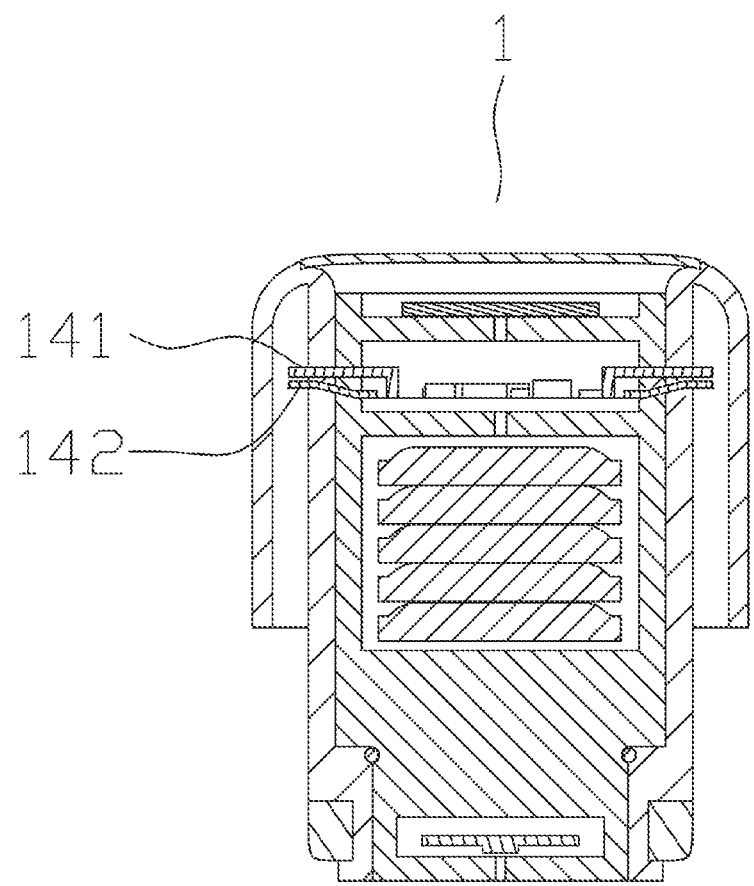
FIG. 6 is a sectional view of a third embodiment of the static detection solution according to the invention.

The foregoing embodiment is only applied to the container having a conducting function, it's not applicable for a container made of an insulating material. Moreover, due to the existence of errors, the container may be not contacting with the limiting devices at the same time, so that the synchronous measurement cannot be implemented. Therefore, the present invention discloses a further improvement. Referring to FIG. 6, the limiting device includes a fixing member 141, and an elastic member 142 correspondingly disposed below the fixing member 141. Both the fixing member 141 and the elastic member 142 are made of a conducting material, the elastic member 142 can move elastically, so as to have a first state switched-on with the fixing member 141 and a second state switched-off with the fixing member 142. When the compression member moves downward to a certain distance, the container opening holds against the elastic member 142 so that the elastic member is contacted and switched on with the fixing member 141. This manner is not limited to the material of the container, thus effectively solving the problem of the foregoing embodiment.

Similarly, the pressure detector starts to detect the pressure in the sealed space when at least one elastic member is under the first state.

Figure 7:
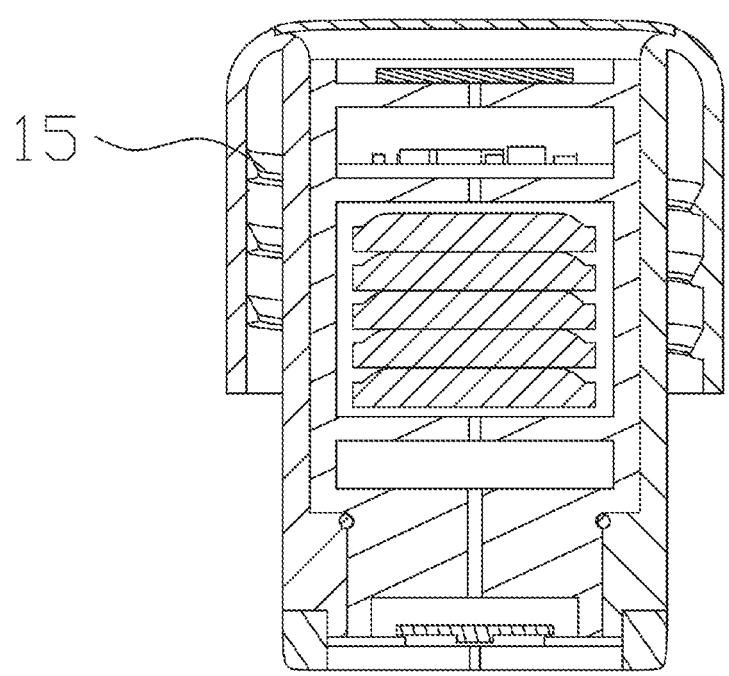
FIG. 7 is a sectional view of a first embodiment of a dynamic detection solution according to the invention.

The present invention further provides another solution of the measuring device, which, similarly, also includes a compression member, a pressure detector and a controller. Compared with the above static detection solution, this solution differs in that the compressed volume values of the gases are not inputted in advance, but are actually detected in real time through a volume detector. Referring to FIG. 7, the volume detector includes a screw thread 15 disposed on the compression member 1, the pitch of the screw thread is fixed and known, and the compression member 1 is screwed on the container through the screw thread, and can screw in and screw out relatively to the container. The volume detector further includes an angle transducer (not shown) capable of detecting the rotating angle of a cover body 10, wherein the transducer can transmit the obtained angle value to the controller, so that the dynamic detection of the movement distance can be implemented through the combination of the angle value and the pitch, thus further determining the compressed volume value of the gases.

It is to be understood that the static detection solution and the dynamic detection solution are not absolutely independent, the two can be combined and used, so as to achieve optimal measuring results.

The measuring device according to the present invention can also be provided with an output terminal, which can output the liquid volume data by means of sound, words or images.

Figure 8:
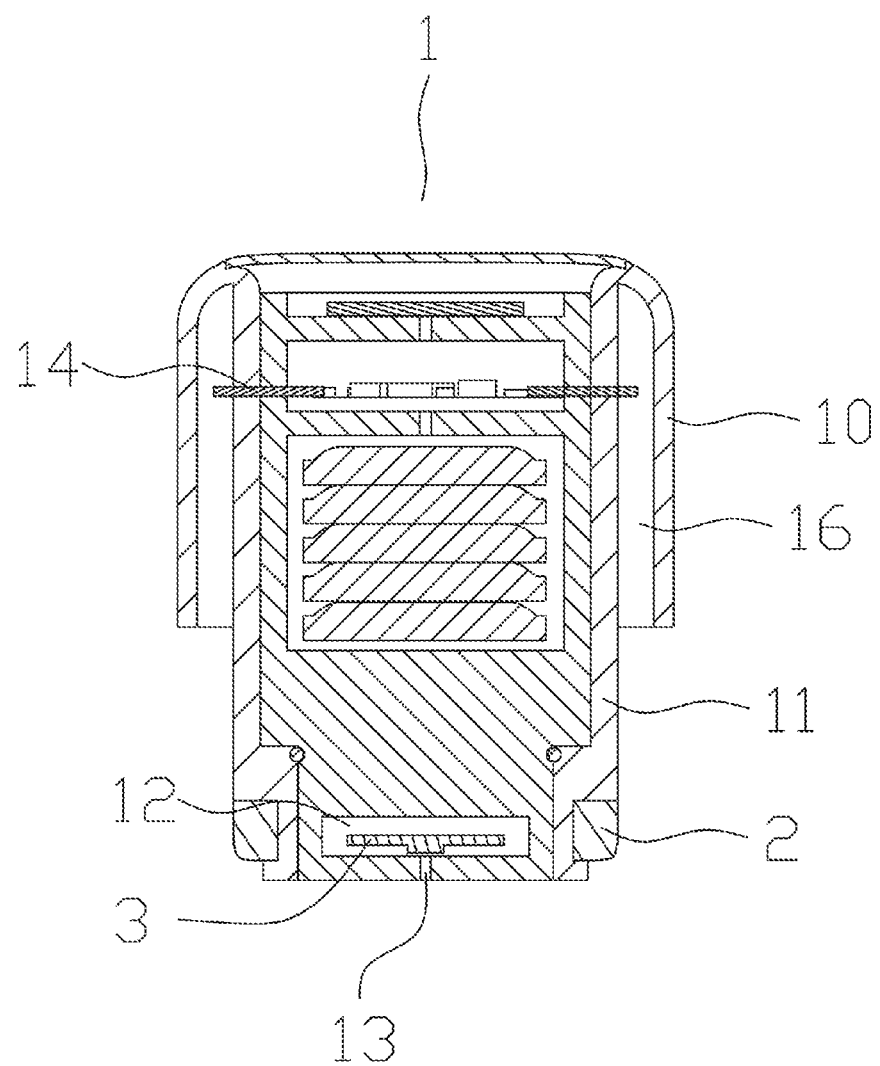
FIG. 8 is a sectional view of an embodiment of a measuring device according to the invention.

FIG. 8 shows a sectional block diagram of an embodiment of the measuring device. The compression member 1 includes a round cover body 10 which includes a base wall and an edge disposed circumferentially along the base wall, the inner side of the base wall is provided with a protruding portion 11, and the protruding portion 11 is preferably cylindrical, which forms a gap 16 with the edge, the gap 16 is configured to accommodate the container opening of the container. The periphery of the protruding portion 11 is provided with a sealing structure. In this embodiment, the sealing structure is preferably a sealing ring 2. When the container opening is inserted into the gap, the inner wall of the container opening is matched with the sealing ring 2 to form a sealed space inside the container.

Further, the pressure detector 3 is disposed in the protruding portion 11. To be specific, a cabin body 12 is disposed on the protruding portion 11, and the pressure detector is fixed in the cabin body. The cabin body 12 is communicated with the external environment when the compression member is separated from the container, and is only communicated with the sealed space when the compression member is in sealed connection with the container, so as to implement the objects of respectively measuring the pressure values of the gases in the container before and after compression. In order to implement this technical effect, an air hole 13 is disposed on the cabin body 12. Preferably, the cabin body 12 is disposed on one end of the protruding portion far from the cover body 10, and the air hole 13 is disposed on the base wall of the cabin body 12.

Because the cabin body 12 is directly communicated with the sealed space, a water proof measure is further provided to prevent liquid or vapor from entering the cabin body 12 and damaging the pressure detector 3. Wherein, one preferred manner is to cover a waterproof breathable film (not shown) on the air hole 13, and another preferred manner is to employ a waterproof pressure detector 3. In a particular implementation, any one of the two can be employed independently or a combination of the two can be employed.

Figure 9:
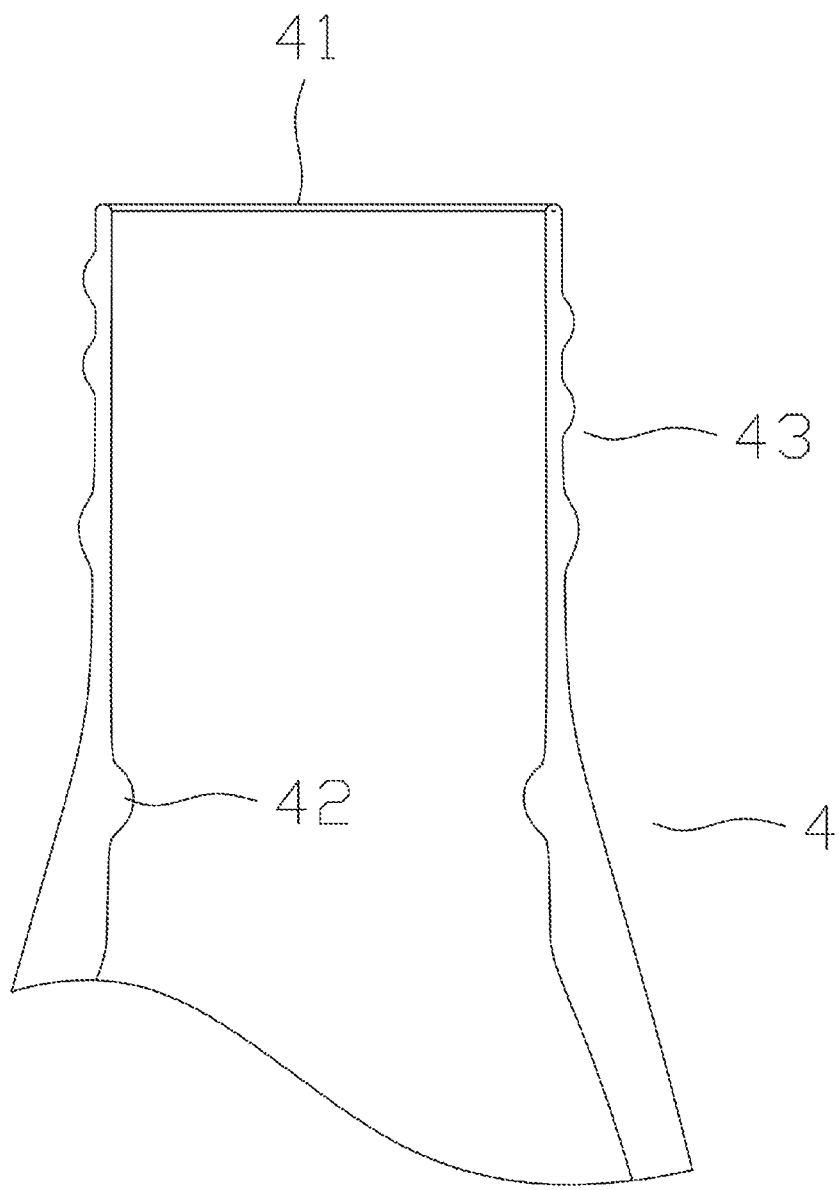
FIG. 9 is a sectional view of an embodiment of a container according to the invention.

The present invention further provides a container capable of measuring internal liquid volume. Referring to FIG. 9, the container 4 is provided with a container opening 41, the compression member 1 is buckled on the container 4, the container opening 41 is inserted in the gap 16 between the cover body 10 and the protruding portion 11, and is in sealed connection with the protruding portion 11 to form a sealed space in the container. By downward pressing or rotating the cover body, the protruding portion 11 can be driven to further stretch into the sealed space, so as to compress the gases in the sealed space.

Preferably, the inner wall of the container 4 is provided with a bulge 42, the sealing ring 2 is extruded by the bulge 42 and deformed when the protruding portion 11 is stretching into the container, so as to implement a better sealing, and position the compress origin more precisely at the same time.

Preferably, the container 4 is provided with a conducting function, which can either be provided with a conducting portion at the container opening 41, or be entirely made of a conducting material.

Preferably, the outer wall of the container 4 is provided with an external thread 43 matched with the screw thread 15.

Figure 10:
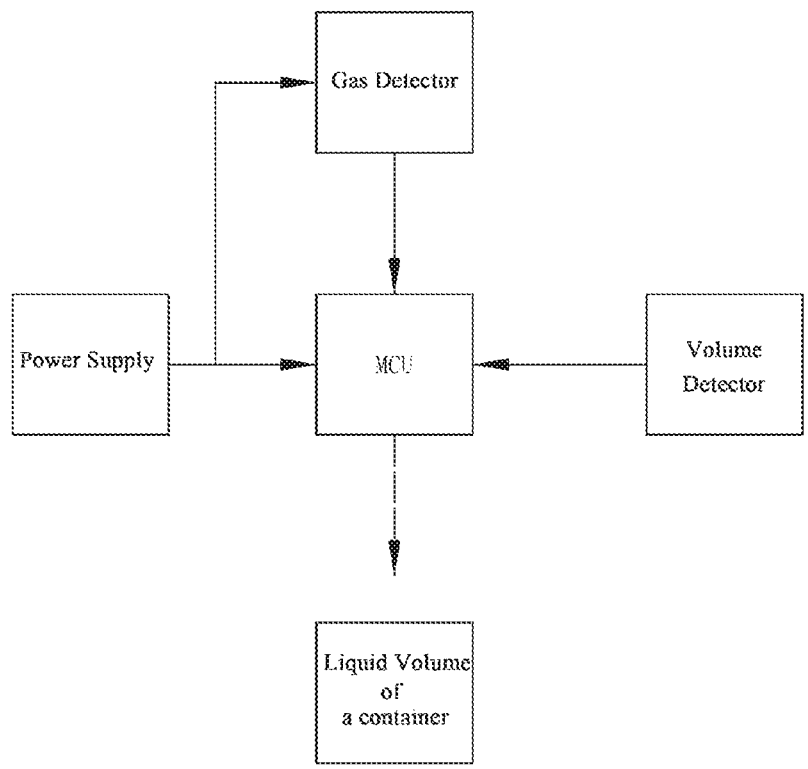
FIG. 10 is a schematic diagram of a pressure detector according to the invention.

The present invention further provides a method of measuring liquid volume in a container. Referring to FIG. 10, the method includes the following steps.

In step S10, a sealed space is formed in the container.

In step S20, gases in the sealed space are compressed. Preferably, a method of compressing the gases is to set a compression member to reduce the volume of the sealed space in a manner of reducing the volume of the sealed space through the movement of the compression member relative to the container; during the movement, the compression member and the container are sealed to prevent the measuring accuracy from being affected by gas leakage.

In step S30, detection parameters for liquid volume are obtained, the parameters including the pressure value in the container before compression, the pressure value in the container after compression, and the compressed volume value of the gases in the container, and the volume value of the container.

Wherein, a method of obtaining the compressed volume value of the gases in the container is: configuring the compression member to be vertical to the above movement direction; configuring the area of a compression surface directly affected on the gases to be fixed and known (the area can be known by defining or measuring in advance); then acquiring the movement distance value of the compression member; and obtaining the compressed volume value of the gases with reference to the area of the compression surface and the distance value.

The present invention provides at least two methods of obtaining the movement distance of the compression member.

1. A limiting device is arranged, and the movement distance of the compression member in each time is fixed and known; in the case that both the compression area and the movement distance of the compression member are constant, the compressed volume value of the gases is also fixed as a constant.

2. The compression member is connected with the container through a screw thread, the pitch of the screw thread is fixed and known, and the rotating angle value of the compression member is detected; then the movement distance value of the compression member can be dynamically obtained through the product of the angle value and the pitch, so as to consequently obtain the compressed volume value of the gases. To be specific, an angle transducer is set, a value is got and recorded as a first angle value when the gases are compressed, a value is got and recorded as a second angle value during a rotating process or when the rotating is stopped, the difference between the second angle value and the first angle value being the rotating angle value of the compression member at a corresponding moment.

The first method usually cooperating a limiting device. After the compression member moves to the limiting position, the limiting device is triggered, and the pressure detector starts to detect the pressure in the container, and this is a static detection method.

For the second method, the pressure detector detects the pressure change in real time (or at a higher frequency) when the compression member is separated from the container. The pressure detector records a first pressure value corresponding to the first angle value, when the compression member is contacted with the container and starts to form the sealed space. Similarly, a second pressure value is recorded during the rotating process or when the rotating is stopped. Moreover, a plurality of values can be recorded as well, and a corresponding liquid value can be obtained through combining any group of the angle values with the pressure values, and the measuring results will be more accurate if a plurality of the measuring values are combined.

Moreover, a method of obtaining the pressure values in the container before and after compression in step S30 is: detecting the pressure values in the container before and after compression through a pressure transducer.

In step S40, the detection parameters for liquid volume are used to obtain the liquid volume in the container. Preferably, a method thereof particularly includes the following steps.

1. The volume value of the gases in the container before compression is obtained according to a formula:

$$V1=P1Vx/(P1-P0)$$

Wherein, V1 is the volume value of the gases in the container before compression, Vx is the compressed volume value of the gases in the container, P0 is the pressure value in the container before compression, and P1 is the pressure value in the container after compression.

2. The liquid volume in the container is obtained according to a formula:

$$V2=V-V1$$

Wherein, V2 is the liquid volume value in the container, and V is the volume value of the container.

The above is specific explanations to the preferred embodiments of the invention, but the invention is not limited to the embodiments. Those skilled in the art may make various equivalent modifications or substitutions without departing from the spirit of the invention, and these equivalent modifications or substitutions shall all fall within the scope defined by the claims of the present invention.

What is claimed is:

1. A device for measuring liquid volume in a container comprising:
   a compression member, which is in sealed connection with a container to be detected, forms a sealed space in the container, and compresses gases in the sealed space under the effect of an external force, and the compressed volume value of the gases is a determined value;
   a pressure detector, which is disposed on the compression member, and configured to measure the pressure values of the gases in the container before and after compression;
   a controller, which is configured to receive the pressure values obtained by the pressure detector, and calculate the liquid volume in the container to be detected, based on the pressure values as well as a stored determined compressed volume value and the volume value of the container to be detected; and
   a limiting device which is configured to limit the movement of the compression member after the compression member moves for a fixed distance.

2. The device for measuring liquid volume in a container according to claim 1, wherein at least two limiting devices are provided and are located on the same plane, the limiting devices are made of a conducting material, and the pressure detector starts to detect the pressure values in the sealed space when the at least two limiting devices are switched on.

3. The device for measuring liquid volume in a container according to claim 1, wherein the limiting device comprises at least one fixing member and an elastic member correspondingly disposed below the fixing member, both the fixing member and the elastic member are made of a conducting material, the elastic member moves elastically, so as to have a first state switched-on with the fixing member and a second state switched-off with the fixing member, and the pressure detector starts to detect the pressure values in the sealed space when at least one elastic member is under the first state.

4. The device for measuring liquid volume in a container according to claim 1, wherein the compression member is a cover body, the cover body is provided with a protruding portion with a fixed and predetermined size, and the periphery of the protruding portion is provided with a sealing ring.

5. The device for measuring liquid volume in a container according to claim 4, wherein the protruding portion is provided with a cabin body, and the pressure detector is disposed in the cabin body; the cabin body communicates with outside through an air hole disposed on the cabin body when the cover body is separated from the container, and only communicates with the sealed space when the cover body is in a sealed connection with the container.

6. The device for measuring liquid volume in a container according to claim 5, wherein the pressure detector implements a waterproof function by covering a waterproof breathable film on the air hole and/or employing a waterproof pressure detector.

7. A container capable of measuring internal liquid volume, wherein the container comprises a container opening, and comprises the device for measuring liquid volume in a container according to claim 1, the measuring device is in a sealed connection with the container opening through the compression member, and forms a sealed space in the container.

8. The container capable of measuring internal liquid volume according to claim 7, wherein an inner wall of the container is provided with a bulge coiled in a circle.

9. The container capable of measuring internal liquid volume according to claim 8, wherein at least the container opening is made of a conducting material.

10. A device for measuring liquid volume in a container, comprising:
a compression member, which is in sealed connection with a container to be detected, forms a sealed space in the container, and compresses gases in the sealed space under the effect of an external force;
a pressure detector, which is disposed on the compression member, and configured to measure the pressure values of the gases in the container before and after compression;
a volume detector, which is disposed on the compression member, and configured to detect a compressed volume value of the gases in the container; and
a controller, which is configured to receive the pressure values obtained by the pressure detector and the volume values obtained by the volume detector, and calculate the liquid volume in the container to be detected based on the pressure values and the volume values above, and the volume value of the container to be detected;
wherein the volume detector comprises an angle transducer and a screw thread disposed on the compression member, and the pitch of the screw thread is fixed and predetermined; the angle transducer is configured to detect the rotating angle value of the compression member, and transmit the angle value to the controller.

11. The device for measuring liquid volume in a container according to claim 10, wherein the compression member is a cover body, the cover body is provided with a protruding portion with a fixed and predetermined size, and the periphery of the protruding portion is provided with a sealing ring.

12. The device for measuring liquid volume in a container according to claim 11, wherein the protruding portion is provided with a cabin body, and the pressure detector is disposed in the cabin body; the cabin body communicates with outside through an air hole disposed on the cabin body when the cover body is separated from the container, and only communicates with the sealed space when the cover body is in a sealed connection with the container.

13. The device for measuring liquid volume in a container according to claim 12, wherein the pressure detector implements a waterproof function by way of covering a waterproof breathable film on the air hole and/or employing a waterproof pressure detector.

14. A method of measuring liquid volume in a container, comprising the steps of:

S10: forming a sealed space in the container;
S20: compressing gases in the sealed space;
S30: obtaining liquid volume detection parameters, the parameters comprising a pressure value in the container before compression, a pressure value in the container after compression, and a compressed volume value of the gases in the container, and a volume value of the container; and
S40: using the liquid volume detection parameters to obtain the liquid volume in the container;
wherein the step S20 of compressing the gases comprises arranging a compression member to reduce the volume of the sealed space through movement of the compression member relative to the container, wherein the compression member is in a sealed connection with the container during the movement;
wherein the step S30 of obtaining the compressed volume value of the gases in the container comprises the compression member being vertical to the above movement direction, the area of a compression surface directly affected on the gases being fixed and predetermined, acquiring a movement distance value of the compression member, and obtain the compressed volume value of the gases with reference to the area of the compression surface and the distance value.

15. The method of measuring liquid volume in a container according to claim 14, wherein the step of obtaining the movement distance value of the compression member comprises arranging a limiting device to fix and predetermine the movement distance of the compression member.

16. The method of measuring liquid volume in a container according to claim 14, wherein the step of obtaining the movement distance value of the compression member comprises connecting the compression member with the container through a screw thread, the pitch of the screw thread being fixed and predetermined, detecting a rotating angle value of the compression member, and calculating the distance value through the angle value and the pitch.

17. The method of measuring liquid volume in a container according to claim 16, wherein the step of detecting the angle value comprises arranging an angle transducer, getting and recording a value as a first angle value when the gases are compressed, getting and recording another value as a second angle value during a rotating process or when the rotating is stopped, the difference between the second angle value and the first angle value being the rotating angle value of the compression member for a corresponding time.

18. The method of measuring liquid volume in a container according to claim 17, wherein the step S30 of obtaining the pressure values in the container before and after compression comprises detecting the pressure values in the container before and after compression through a pressure transducer.

* * * * *